(12) United States Patent
Cannella et al.

(10) Patent No.: US 10,369,925 B2
(45) Date of Patent: Aug. 6, 2019

(54) INTEGRATED AND AUTOMATED AUTOMOTIVE BRAKE/HORN/LIGHT APPARATUS

(71) Applicants: Robert J. Cannella, Hillsboro Beach, FL (US); Mark D. Lorusso, Portsmouth, NH (US)

(72) Inventors: Robert J. Cannella, Hillsboro Beach, FL (US); Mark D. Lorusso, Portsmouth, NH (US)

( * ) Notice: Subject to any disclaimer, the term of this patent is extended or adjusted under 35 U.S.C. 154(b) by 0 days.

(21) Appl. No.: 15/177,304

(22) Filed: Jun. 8, 2016

(65) Prior Publication Data

US 2016/0355179 A1 Dec. 8, 2016

Related U.S. Application Data

(60) Provisional application No. 62/172,268, filed on Jun. 8, 2015.

(51) Int. Cl.
| | | |
|---|---|---|
| *B60W 30/08* | (2012.01) | |
| *B60T 7/22* | (2006.01) | |
| *B60Q 1/46* | (2006.01) | |
| *B60Q 5/00* | (2006.01) | |
| *B60T 17/22* | (2006.01) | |
| *B60Q 1/52* | (2006.01) | |
| *B60Q 9/00* | (2006.01) | |

(52) U.S. Cl.
CPC ............ *B60Q 5/006* (2013.01); *B60Q 1/525* (2013.01); *B60Q 9/008* (2013.01); *B60T 7/22* (2013.01); *B60T 17/22* (2013.01); *B60Q 2900/30* (2013.01); *B60T 2201/022* (2013.01)

(58) Field of Classification Search
CPC .......... B60Q 5/006; B60Q 1/46; B60Q 9/008; B60Q 1/525; B60Q 2900/30; B60T 17/22; B60T 7/22; B60T 2201/022
USPC .......................................... 701/48
See application file for complete search history.

(56) References Cited

U.S. PATENT DOCUMENTS

| | | |
|---|---|---|
| 6,166,656 A | 12/2000 | Okada et al. |
| 8,581,126 B1 | 11/2013 | Cannella |
| 9,776,631 B1 * | 10/2017 | Domeyer .............. B60W 30/09 |

(Continued)

FOREIGN PATENT DOCUMENTS

CN         203391687 U   *   1/2014

*Primary Examiner* — Brian P Sweeney
(74) *Attorney, Agent, or Firm* — Lorusso & Associates

(57) ABSTRACT

An apparatus and method to automatically and individually, simultaneously, and/or sequentially operate a horn system, a light system and/or a braking system of a vehicle. A threat detection system secured in the vehicle detects threats and sends one or more signals, directly or indirectly, to the braking, horn and/or light systems to activate those systems to improve delivery time of safety and/or emergency warning signals to third party vehicles and pedestrians. The systems can be connected directly via relay, or may incorporate an intermediary electronic control unit or controller to coordinate operation of the systems. A deactivation device enables a driver to disconnect the threat detection system from the horn, light and braking systems to permit manual control of those systems. A second deactivation device permits the driver to disconnect coordinated control of the brake, horn and/or light systems from the threat detection system.

18 Claims, 11 Drawing Sheets

(56) References Cited

U.S. PATENT DOCUMENTS

2003/0016143 A1* 1/2003 Ghazarian ............. G08G 1/017
                                                    340/901
2012/0028580 A1   12/2012 Oesterling et al.

* cited by examiner

INTEGRATED AND AUTOMATED AUTOMOTIVE BRAKE/HORN/LIGHT APPARATUS

CROSS REFERENCE TO RELATED APPLICATIONS

This regular utility application claims the benefit of U.S. Provisional Application Ser. No. 62/172,268, filed Jun. 8, 2015, the contents of which are incorporated herein by reference.

BACKGROUND OF THE DISCLOSURE

The disclosure relates to a method and apparatus for simultaneously operating and enhancing multiple automotive warning systems when automated threat detection systems engage the warning systems. More particularly, the present disclosure relates to a method and apparatus for sending combined or separate audible and visual warning signals when an automated threat detection system detects a threat. The threat detection system either activates the vehicle horn and/or light systems directly, or activates the braking system to rapidly decelerate the automobile that then activates the horn and/or lights systems during and/or following rapid changes in vehicle velocity.

DESCRIPTION OF THE ART

As is commonly known, automotive vehicles, (cars, trucks, vans, SUV's, tractor trailers, buses, etc.), include a horn that can be engaged to produce audible warnings to the operators of other vehicles and/or to pedestrians. Horns work particularly well in rather quiet environments, such as country roadways, where the variety and intensity of sound is limited and relatively subdued. Busy city roads are another matter. Due to the high level of noise as well as the cacophony of sounds, horn signals are often hard to hear particularly by those with diminished hearing, attention spans and visual acuity, e.g., individuals suffering from macular degeneration—not unexpected with an aging population. Added to this are the ever advancing automobile sound systems which, in conjunction with improved sound proofing technologies used to block out sounds emanating from outside a vehicle, can severely attenuate and even block out sound warning signals sufficiently to prevent perception by passengers in third party vehicles.

To address this problem, a system to permit manually initiated combined operation of a vehicle's horn and light system was made the subject of my prior patents, U.S. Pat. Nos. 8,003,902 and 8,581,126, the contents of which are incorporated in their entirety herein by reference. These patents covered numerous embodiments including automated combined activation of vehicle horn and light systems via manual operation of the vehicle's braking system. The efficacy of using simultaneous horn/light activation to provide enhanced warnings is borne out by the incorporation of these systems into automotive theft detection systems.

Vehicle technology has advanced significantly in the last decade whereby operational systems are becoming more automated and integrated to increase and enhance the safety features of vehicles. To that end, numerous threat detection systems and other safety enhancement features have been developed to create a safety envelope around a traveling vehicle by giving the driver enhanced warning beyond visual perception. One such system, a collision mitigation brake system, will automatically apply the brakes and provide the driver with visual and audible warnings when an imminent collision event is detected. Other threat detection systems give a visual or audible warning to the driver with respect to impending danger. The warning systems employ long-range and short-range radar, sonar, Mobileye cameras, LIDAR (laser radar) and the like to detect obstacles, stationary and moving.

Another potential safety advancement is the use of LED running lights positioned about the main headlights in a number of different vehicles. In at least some models, these lights are configured to remain activated when a car is being operated. Although these lights may have improved the perception of a moving vehicle, the lights have become so commonplace that their intended signaling effect has become significantly diminished. The sustained lighting does not give any indication of changes in the vehicle's safety envelope or potential change in operation and has become the visual equivalent of a white noise machine.

Threat detection systems have aided driver operated vehicles to drive in a safer manner. The same threat detection systems have been incorporated into autonomous vehicles to permit autonomous vehicle operation. Problems have started to arise, however, with semi-automated and fully autonomous vehicles. Some, such as those being developed by Google, have been involved in accidents. The vehicles have not failed to function properly, but have been hit by driver operated vehicles. There is no current visual and/or audible signaling system to warn third party vehicles (driver operated or autonomously operated vehicles), about potential crash threats. Should a semi-automated or fully automated vehicle be compromised, e.g., have its software hacked so as to malfunction, or have a system malfunction, there is no warning to third party vehicles or pedestrians in the vicinity of the vehicle that the vehicle is malfunctioning and may cause an accident. What is needed and what we have devised is an apparatus and method to provide an automated visual warning signal coordinated with the emission of an audible warning signal to enhance third party recognition of a potentially hazardous situation.

SUMMARY OF THE DISCLOSURE

In one aspect of the disclosure, a combined audio/visual warning signal system is provided that coordinates the horn and light systems of motorized vehicle horns and exterior and/or interior lights to provide both an audible and visible emergency or hazard warning to third party vehicle drivers and passengers, and pedestrians within the reception range of the signals. The multi-component warning system is activated either directly by a threat detection or warning system, or indirectly by the vehicle's central processor, or electronic control unit(s). As used herein, threat detection system shall mean any detection system including, but not limited to, long-range and short-range radar, sonar, Mobileye cameras, LIDAR (laser radar) and the like to detect obstacles, stationary and moving. As used herein, sensor shall mean any sensor of a threat detection system that can detect moving or stationary objects in the vehicle's environment. Also as used herein, vehicle shall mean any driver-operated, semi-automated, or fully automated vehicle including passenger and commercial vehicles, trucks (private and commercial), buses, amphibious vehicles, flying vehicles and any other device that uses an engine, motor or other energy generating source to propel the device across distances.

In one embodiment, a threat detection system identifies a threat via one or more sensors. The system sends a signal to a relay that sends a signal to the horn system and a signal to the designated vehicle light system(s) to effectuate a combined audible and visual warning signal to third party vehicles and pedestrians. In another embodiment, the threat detection system, light system(s) and horn system can be directly connected via hardwire to a controller positioned electrically in between the three systems. Alternatively, the threat detection, light(s) and horn systems can be connected to a central processing system, or an electric control unit illustratively in the form of a central control module, electronic control module, a general electronic module, or any electronic control unit (ECU) that has one or more of the following: a microcontroller, memory, inputs (supply voltage, digital and/or analog inputs), outputs (relay drivers, logic outputs), actuators and/or communication links. One or more ECU's may be used to put into effect the threat detection system activation of the other disclosed systems (brake, light, horn, etc.), and may be connected via one or more electrical buses and use the Controller Area Network (CAN) standard or other communication standard to permit communication among the electronic components The horn and light systems are activated when a signal is received directly from the threat detection system, or from a controller, or electronic control unit(s).

In another aspect of the disclosure, the horn and light systems are wirelessly connected, e.g., via radio frequency communication, to either an electronic controller or an intermediate central processing unit or central processing system that may also be part of the threat detection system. The lights activated by the automated system can vary to include one or more sets of vehicle lights to adjust the intensity of the visual emission and/or to comply with any local, state and/or federal regulations. Additionally, the lights may be programmed to flash during selected intervals to convey a specific type of warning.

In another aspect of the disclosure, a disengagement controller is provided to enable a vehicle operator to disengage the threat detection system from the combined horn/light system so the horn and light systems can be operated independent of the threat detection system. The disengagement controller can be positioned on the steering wheel, on the steering column, on a lever projecting from the steering column, on the vehicle dash board, on a vehicle door, or on any center console, or at any location ergonomically convenient to the vehicle operator.

In a further aspect of the disclosure, to enable the threat detection system to engage the horn system without the light systems, or the light system(s) without the horn system, an auxiliary control is provided to permit selective detachment of the coordinated horn and light systems. The auxiliary control can be positioned on the steering wheel, steering column, on a lever projecting from the steering column, or anywhere inside the vehicle. In an alternative embodiment, the threat detection system is connected, via hard wire or wirelessly separately to the horn and light systems to permit separate operation of the two systems. In a further alternative embodiment, the threat detection system is connected independently to the horn system and the light system with an intermediary electronic control unit, central processor, etc., that permits the threat detection system to activate the horn and light systems separately, or in tandem.

In a still further aspect of the disclosure, the vehicle horn and light systems are secondarily controlled in a combined manner by automated operation of the vehicle's braking system. When the threat detection system detects a threat, a signal is sent to the central processing system and/or controller that, in turn, sends a signal to the braking system to activate the brakes. The apparatus may include control parameters involving any application of the braking system and/or may be configured to operate the horn and light systems, individually or combined, with the application of specific brake-application pressure ranges and/or defined "rapid" application of the braking system. In an alternative embodiment, the threat detection system is connected, via hard wire or wirelessly, directly to the braking system and activates the braking system when a threat is detected. In a further alternative embodiment, the threat detection system is connected directly to the braking system, horn system and light system, via hard wire or wirelessly, to operate each system separately in consecutive, simultaneous, sequential, or random activation patterns.

In a yet further aspect of the disclosure, the apparatus may also include automated separate and individual activation of the light or horn systems after automated brake system activation by the threat detection system(s). It should be understood that multiple threat detection systems may be incorporated into a single vehicle and that multiple threats may be detected consecutively or simultaneously. The system can be implemented to prioritize multiple threats detected based on parameters such as immediacy of threat and potential severity of threat so as to determine the degree of brake activation necessary, which, in turn, or concurrently, results in combined or separate horn and light activation.

In a yet further aspect of the disclosure, the light component of the combined horn/light warning signal may be adjusted for brightness to accommodate different natural lighting conditions. Darker conditions may be used to limit warning flashes to low beam intensity while lighter conditions may be used to employ high beam intensity to ensure maximum visual perception by third party vehicle occupants and pedestrians in the warning signal reception area. Different light systems e.g., the interior lights or segments of the interior lights may also be selectively activated to impart a particular light intensity. The light component may also be adjusted for rapidity and frequency of light flashing. For example, light flash rapidity and frequency may be set to be linear or logarithmic with respect to the closure rate between the vehicle and a detected threat, such as a vehicle approaching from behind. A stationary person in the travel path of a vehicle will result in one level of light flash frequency, while an oncoming third party vehicle in the vehicle travel path will result in a more rapid light flashing sequence due to the higher closure rate. Light brightness or intensity may also be altered in a repeating sequence along with flash frequency to indicate an acute threat situation.

In another aspect of the disclosure, sudden, rapid changes in vehicle velocity (not caused by manual or automated brake system activation) may be used to trigger combined horn/light operation to alert surrounding vehicles in a 360° radius and/or pedestrians of the vehicle's sudden change in velocity. Should a vehicle be involved in an accident, such as a roll-over, the horn and light systems will be activated and sustained to alert passersby. The horn and light systems may be coordinated in an activation pattern to enhance the warning signal, or to convey a specific type of warning signal to alert passersby of a particular kind of accident, danger event, etc. An optional backup battery may be included to operate the horn and light systems following an accident. These and other aspects of the disclosure will become apparent from a review of the appended drawings and the detailed description.

In a yet further aspect of the disclosure, a turn-signal system is connected to an onboard GPS system that activates the turn-signal system to correspond to anticipated turns in a predetermined travel route. The turn-signal control system may be disengaged by the driver via a disengagement selector switch, or GPS setting. These and other aspects of the disclosure will become apparent from a review of the appended drawings and the detailed description.

DETAILED DESCRIPTION OF THE DISCLOSURE

Figure 1:
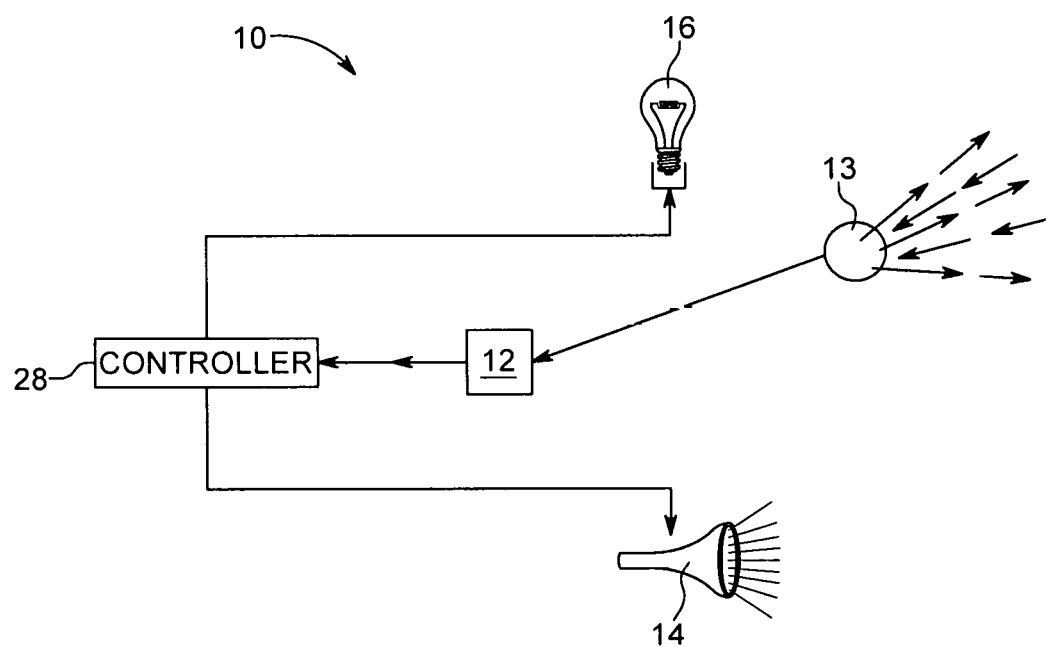
FIG. 1 shows a schematic of a threat detection system connected to a horn/light controller according to one embodiment of the disclosure.

Referring to the drawings and, in particular, FIG. 1, in one aspect of the disclosure, a vehicle warning system designated generally as 10 is secured in a vehicle (not shown), and includes a threat detection system designated generally as 12 secured in the vehicle to detect stationery and/or mobile threats such as debris strewn across a thoroughfare or a pedestrian walking across a street. Threat detection system 12 can be selected from a variety of systems including illustratively, but not limited to, long-range and short-range radar, sonar, Mobileye cameras, LIDAR (laser radar) and the like. Any detection system used will have at least one sensor secured in the vehicle to detect potential threats. As used herein, sensor shall mean any sensor of a threat detection system that can detect stationary or moving objects in the general vicinity of the vehicle in which the warning system and sensor are secured. It should be understood that more than one sensor may be part of a single threat detection system with the sensors positioned throughout the vehicle including the front, back, sides, top and bottom to detect oncoming threats from all directions relative to the vehicle.

Figure 9:
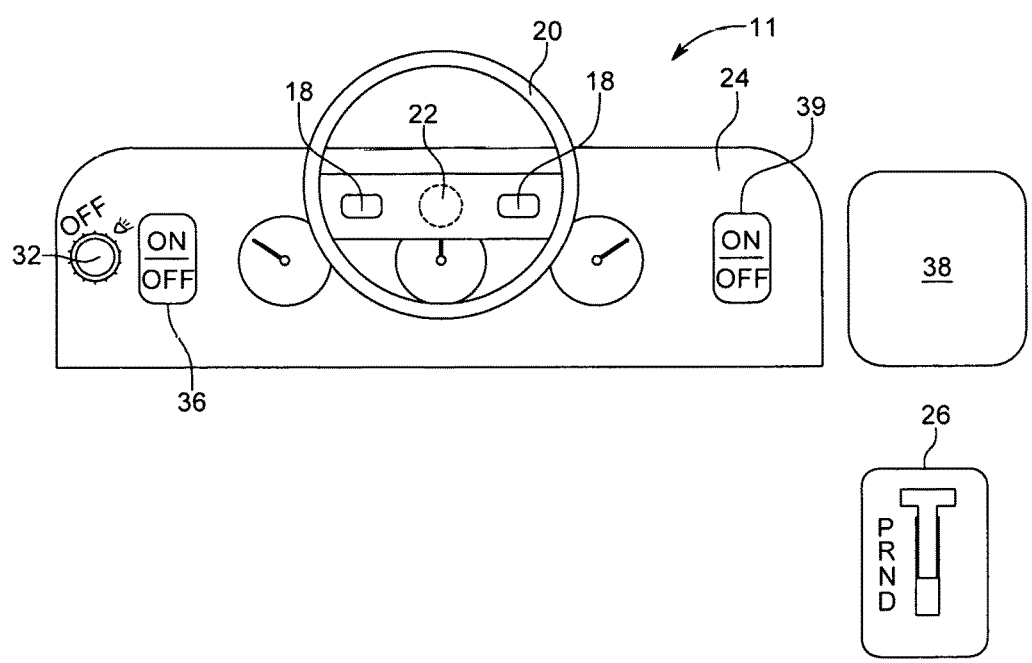
FIG. 9 shows a front view of a vehicle driver side dash board steering wheel and instrument cluster according to an embodiment of the disclosure.
Figure 10:
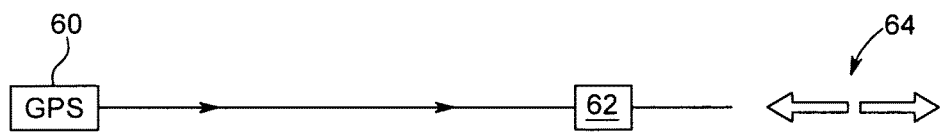
FIG. 10 shows a schematic turn signal system controlled directly by a GPS system according to a further embodiment of the disclosure.
Figure 11:
FIG. 11 shows a schematic turn signal system controlled directly by a GPS system with an intermediary relay according to a further embodiment of the disclosure.
Figure 12:
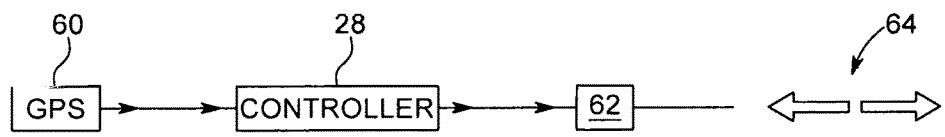
FIG. 12 shows a schematic turn signal system controlled indirectly by a GPS system with an intermediary controller according to a yet further embodiment of the disclosure.

In one embodiment, warning system 10 further includes a horn system designated generally as 14 and a light system designated generally as 16. As shown in FIG. 9, a driver control cluster shown designated generally as 11 includes horn system 14 that will have a manual horn operation controller 18 positioned optionally on a steering wheel 20, a steering column 22, on a dash board 24, on a center console 26, or on some other vehicle interior compartment surface within reach of the driver in an ergonomic manner. Horn system 14 includes conventional vehicle horns and any device capable of emitting an audible signal or warning. Horn system 14 may be connected to a vehicle electronic control unit or central processing unit 28 that can electronically control operation of the horn system. Threat detection system 12 also may be connected to control unit 28. Sensor(s) 13 are connected to, or are a part of, threat detection system 12 and can detect a threat that triggers threat detection system 12 to send one or more signals to control unit 28 that sends a signal to activate horn system 14. In an alternate embodiment, the threat detection system is connected directly, via hard wire or wirelessly, to the horn and light systems and activates those systems when sensor(s) 13 detect a threat.

Light system 16 includes a manually operable controller 30 that may include a rotating knob, toggle or slide switch 32 with a series of light operation selections, e.g., low beam, high beam, fog lights, interior lights, hazard lights, etc. Light system 16 also may be connected to control unit 28 and may be operated automatically by the control unit. Sensor(s) 13 that detect a threat trigger threat detection system 12 to send one or more signals to control unit 28 that sends a signal to activate light system 16. In an alternative embodiment, threat detection system 12 is connected directly to light system 16, via hard wire or wirelessly. In this embodiment, when sensor(s) 13 detect(s) a threat, one or more signals are sent to activate light system 16.

Figure 2:
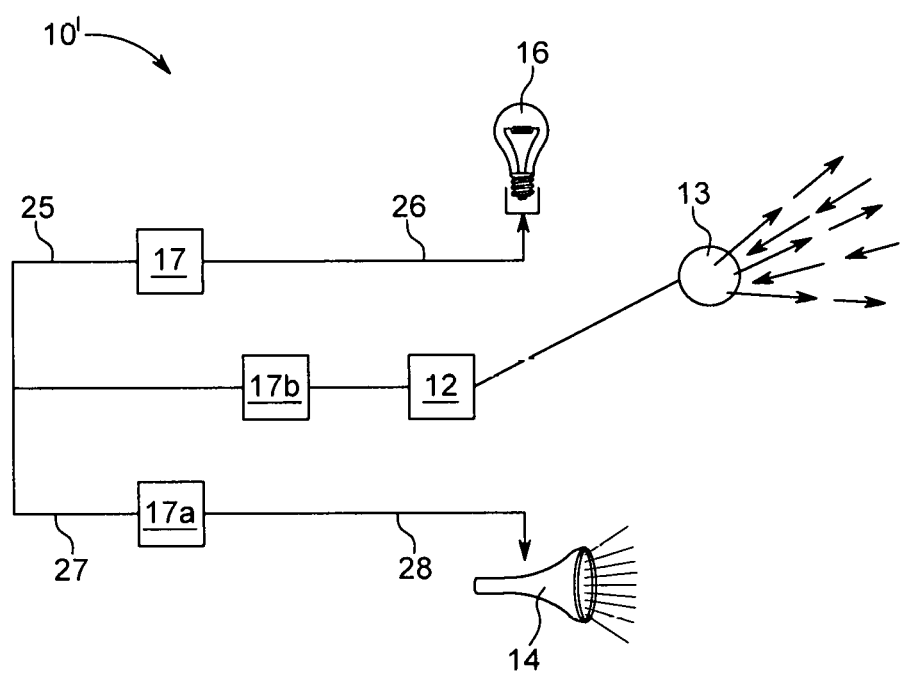
FIG. 2 shows a schematic of a threat detection system connected to a horn/light controller with multiple relays according to another embodiment of the disclosure.

As shown in FIG. 2, in an alternative embodiment, a vehicle warning system designated generally as 10' that includes horn system 14 and light system 16 may be directly connected to threat detection system 12 via a relay 17 or like means. In this embodiment, any threat detected by a sensor causes threat detection system 12 to generate a signal and send the signal (via relay, directly or wirelessly) to the horn and light systems. This activates the systems in an automated manner to provide third party vehicles including their occupants as well as pedestrians, within visual and audible range, with an audible and visual warning. For embodiments that connect the three systems via control unit 28 (such as shown in FIG. 1), the control unit may include algorithms to modify the warning signals with respect to direction, intensity, longevity and/or modulation. For example, for a threat determined to be high priority in terms of potential severity or immediacy, the system illustratively may use the high beam setting, or a combination of high beam and low beam, and use rapid successive pulses of both the horn and the light(s) to give an enhanced warning to other vehicles and pedestrians. The system may use existing vehicle lights and horn(s) in a repurposed manner, or may employ dedicated light/light clusters and multiple dedicated horns positioned at different locations on the vehicle to enable directional control of threat detection signaling from different ends or sides of the vehicle.

Whether the threat detection system is directly connected (via hard wire or wirelessly) to the horn and light systems, or indirectly connected via an intermediary device such as an electronic control unit, the combination can be configured to function in a variety of ways. A detected threat by a threat detection sensor or multiple sensors can activate only the light system (selected lights), only the horn system, or activate a combination of the horn and light systems in a consecutive, sequential or random activation pattern. Regardless whether the horn and light systems are activated alone, or in combination, the parameters of activation can be one of numerous combinations. By way of illustration, activation of the light system can be a short burst, sustained activation, or pulsing activation over a period of time. Multiple light systems (high beam, low beam, fog lights, hazard lights, front lights, rear lights, side lights), may be activated individually, concurrently, sequentially, in an alternating pattern or in a random pattern.

The activation can match, in degree of intensity and/or duration, the potential severity or immediacy of the detected threat. The activation can also be focused and directed toward the perceived direction of the threat. For example, if a threat is detected at the back of the vehicle, e.g., another vehicle is fast approaching and accelerating rather than decelerating, the threat detection system can activate rear lights and/or horns to impart a visual and/or audible warning to the fast approaching vehicle.

With respect to activation of the horn system, the same kind of variability in sound production can be implemented. The produced sound can vary, in degree of intensity or duration, and direction, to match the direction, potential severity or immediacy of the detected threat. Horn activation can be a short burst, sustained activation, or pulsing activation over a period of time. For horns configured to impart different tones or different decibel levels, the horns may be activated to use these capabilities to produce different sounds and/or sound intensities to approximate the immediacy or potential severity of the detected threat. The sounds may also be coordinated to mimic pre-existing sound-based warning patterns. An illustrative example would be horn sounds that mimic an ambulance warning sound. These variations in horn operation can take place independently, separately, randomly, variably, concurrently, or consecutively with the light system(s) function.

The automated horn/light system may be manually deactivated by the driver to disconnect or deactivate the threat detection system from the horn and light systems. Deactivation may be accomplished with a deactivation switch 36, or may be an optional selection of the programmed onboard computer with a computer screen interface 38. The computer control screen will have a threat detection de-selection option that can be implemented to electronically disconnect the threat detection system from the horn/light systems. In addition, in an alternative embodiment, the horn system and the light system(s) may be selectively and separately disconnected, or deactivated from the threat detection system so that each system may be operated independently and separately by the threat detection system. As shown in FIG. 9, this may be accomplished with a horn/light separation switch 39, or may be implemented with a programmed electronic disconnect accessed as an option on interface 38.

Figure 3:
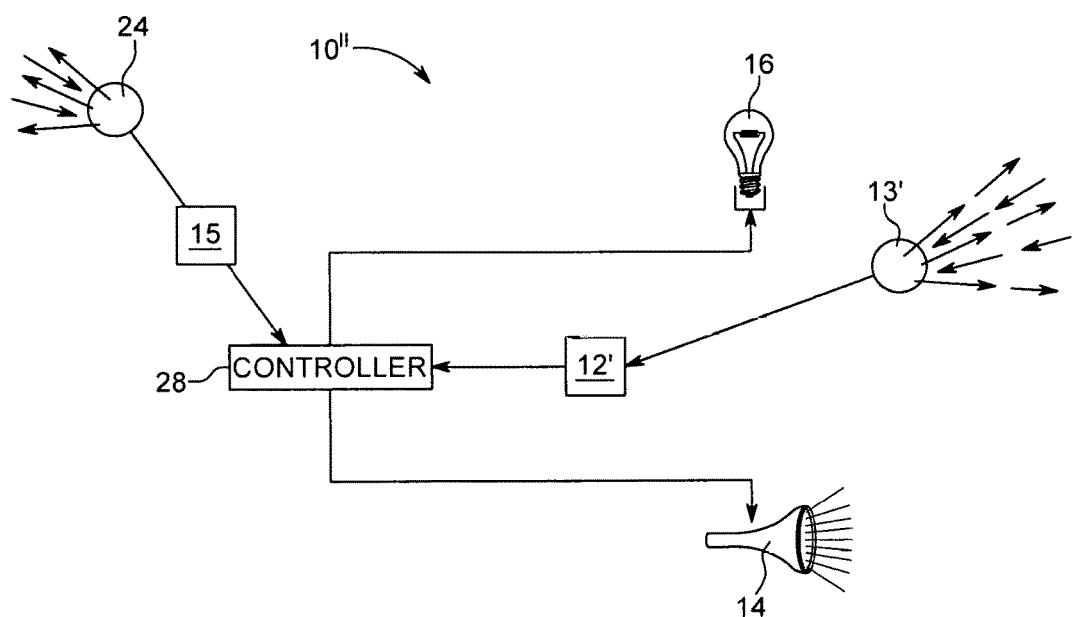
FIG. 3 shows a schematic of a threat detection system connected to a horn/light controller according to a further embodiment of the disclosure.

Referring to FIG. 3, in another aspect of the disclosure, a vehicle warning system designated generally at 10" includes a plurality of threat detection systems. It should be understood that elements assigned primed reference numbers in one embodiment correspond to elements in other embodiments assigned the same reference number, unprimed or differently primed. Warning system 10" includes a first threat detection system 12' secured in the vehicle. System 12' includes at least one sensor 13' secured in the vehicle. The sensor may be positioned anywhere on the vehicle including, illustratively, the front, sides, back, top and bottom of the vehicle in which warning system 10' is secured. The sensor can be any of a variety of sensors that detects the presence of moving and stationary objects in the vicinity of the vehicle. In an alternate embodiment, multiple sensors 13' are positioned strategically about the vehicle to detect potential obstacles and threats within the vicinity of the vehicle.

With multiple sensors positioned about the vehicle, it is possible, and even likely, that multiple threats may be detected simultaneously in any given period of time. The sensors, via first threat detection system 12', may be connected to the vehicle's central controller or central processing unit 28 that may be programmed to prioritize simultaneously detected threats or objects in the detection fields of the sensors. The prioritization step may involve prioritizing the potential severity or immediacy of the detected threats, or prioritizing any other parameters of the detected threats. The reaction time of the controller to send a signal to the horn and/or light systems to activate those systems may be based on the detected threat considered the most significant risk in terms of severity or immediacy.

In a further embodiment, warning system 10" includes a second threat detection system 15 that can be of any of the variety of threat detection systems disclosed herein. Detection system 15 has at least one second threat detection system sensor 24 positioned on the vehicle. Like detection system 12', detection system 15 is connected to controller or central processing unit 28. With two or more threat detection systems incorporated into the vehicle, controller 28 prioritizes all the threat detection signals received from the threat detection systems in the same manner disclosed above for the single threat detection system with multiple sensors. The results of the prioritization step determine the speed at which the controller sends a signal to the horn and/or light systems, individually, simultaneously or consecutively, to activate those systems and emit audible and visual warnings to third party vehicles and pedestrians.

With respect to the signals sent simultaneously to the horn and light systems by controller 28, an electrical signal is sent to light system 16 via light lines 25 to light relay 17. The signal is then sent via light relay lines 26 to light system or light(s) 16. Substantially simultaneous with the transmission of an electrical signal to light(s) 16, a second electrical signal is sent to horn relay 17a via horn lines 27. The second electrical signal is then sent via horn relay lines 28 to horn 14. It should be understood that with respect to light relay 17 at least one additional pair of lines connects the conventional light controls to the relay. In an alternate embodiment, controller 28 is connected directly to light system 16 and horn system 14 without intermediary relays.

With respect to the embodiment shown in FIGS. 1-3, to enable a driver to disconnect or disengage the light function from the horn function when activated directly or indirectly by the threat detection system, a horn/light system control switch 36 is positioned in electrical communication between controllers 28 and light relay 17. The "on" setting may be configured to disconnect light relay 17 from controller 28, or connect the two elements.

With respect to the embodiments shown in FIGS. 1-3, to enable a driver to disconnect the threat detection system from the brake, horn and/or light systems, a threat detection/brake/horn/light control switch 39 is positioned in electrical communication between controller 28 and light relay 17, directly between controller 28 and any of the brake, horn and/or light systems. The "on" setting may be configured to disconnect or decouple light relay 17 (or brake, horn and/or light systems directly) from controller 28 or connect the two (or more) elements. As should be understood, a control switch can also be implemented that disengages simultaneous control of all three systems, but maintains control of the brake, horn and/or light systems independently by the threat detection system.

It should be understood that the elements of the automated warning system can be constructed with relays between each of the sub-systems (threat detection, light, horn and central controller), electrically connected via hard wire or wirelessly. It should further be understood that the elements of the automated warning system can be constructed without relays between each of the sub-systems (threat detection, light, horn and central controller), electrically connected via hard wire or wirelessly. In a further alternate embodiment, one or more, but not all the sub-systems are electrically connected with relays.

Figure 4:
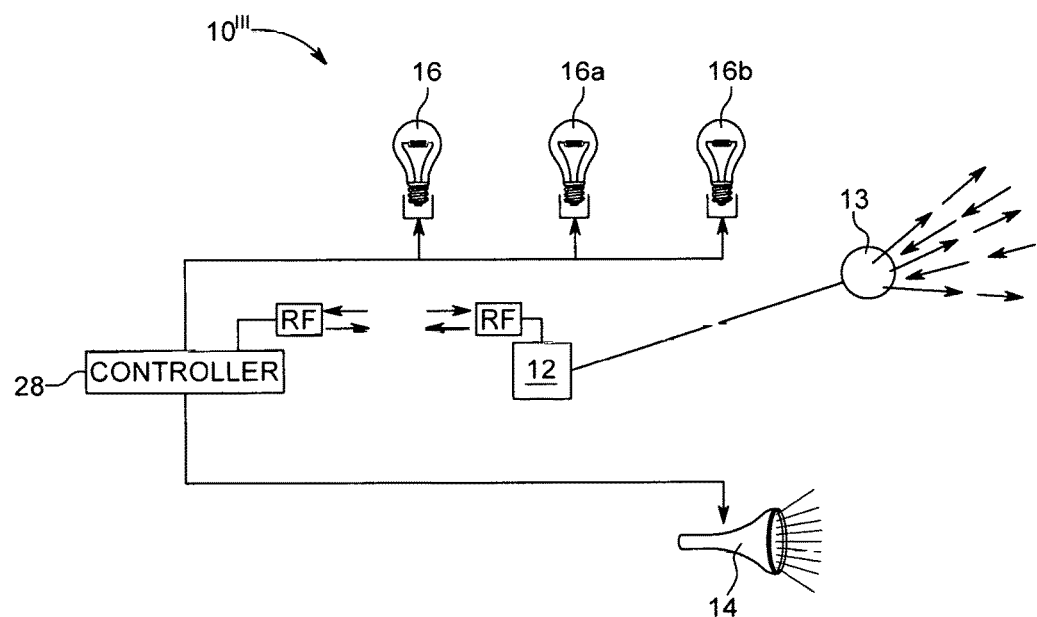
FIG. 4 shows a schematic of a threat detection system connected to a horn/light controller with multiple light systems according to another embodiment of the disclosure.

Referring now to FIG. 4, a vehicle warning system designated generally as 10''' includes a dual horn/light operating system in which threat detection system 12 is connected wirelessly with one or more RF or infra-red transmitters and one or more RF or infrared receivers to a central processing unit or controller 28. Central processing controller 28 receives the signal from threat detection system 12 and processes it according to preconfigured programming to send one or more desired signals to the horn and/or light systems to emit the desired warning signal(s). As is well known in the art, central processing controller 28 can be programmed to operate a specific light system 16 and/or multiple light systems 16, 16a, and 16b as shown. As previously disclosed, controller 28 may also be programmed to activate the light system to emit pulsing light flashes in some pre-determined pattern to impart a specific type of warning signal(s).

Figure 5:
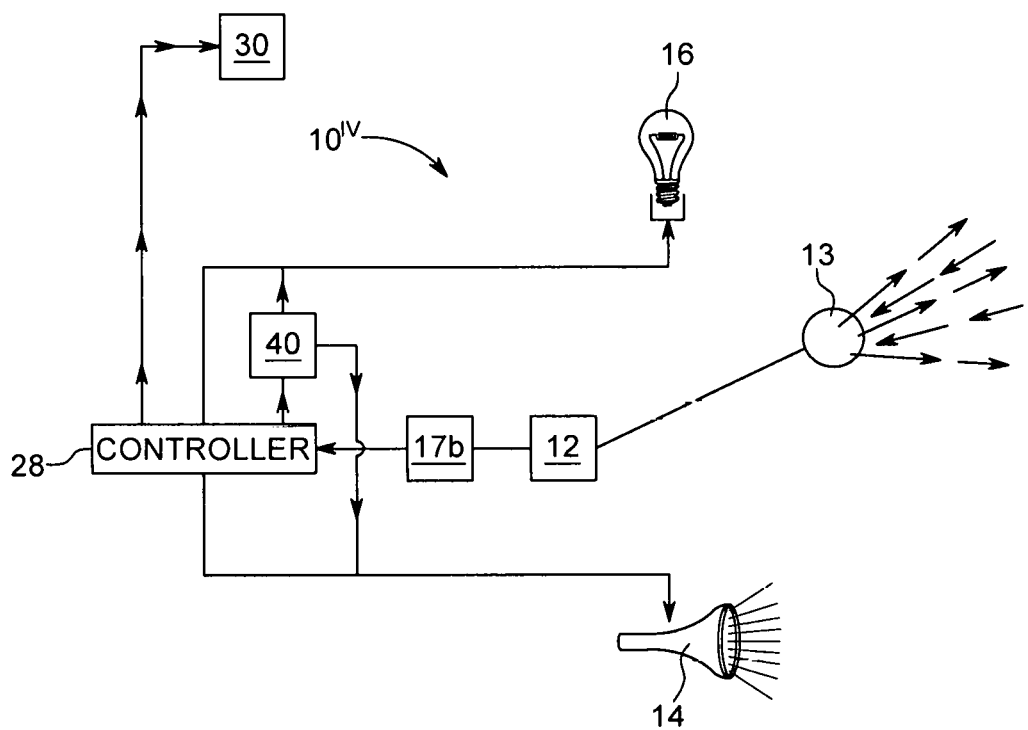
FIG. 5 shows a schematic of a threat detection system connected to a horn/light/brake controller with a horn/light switch relay according to a yet further embodiment of the disclosure.
Figure 6:
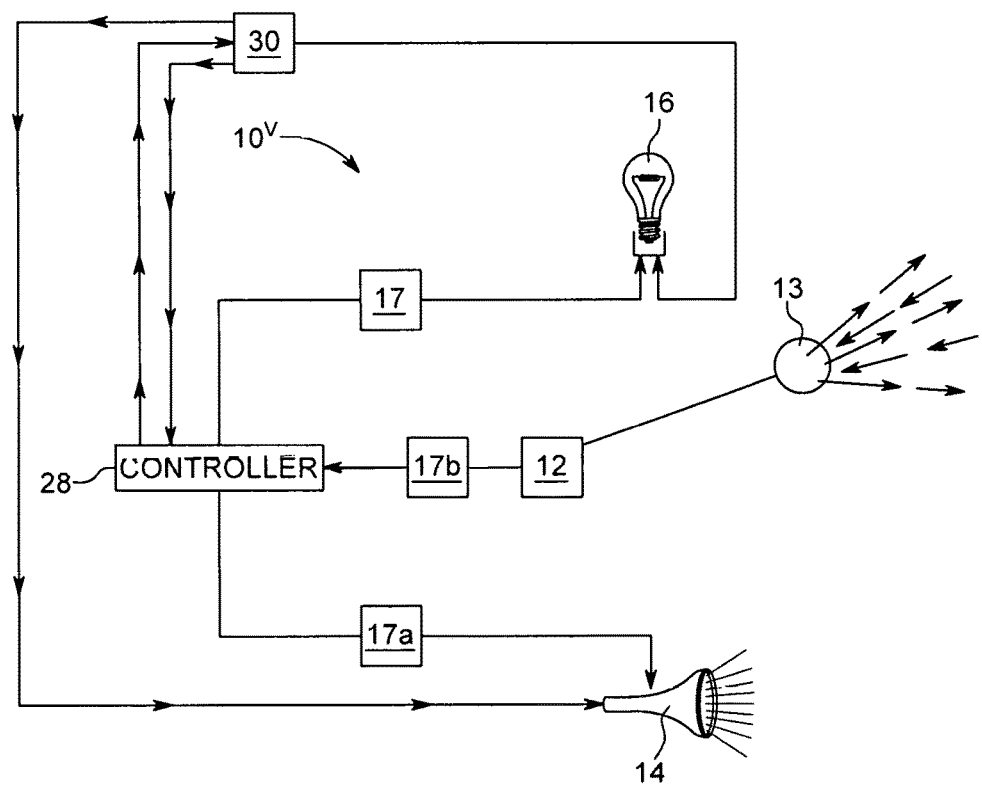
FIG. 6 shows a schematic of a threat detection system connected to a horn/light/brake controller with light and horn relays and direct connection between the brake system and the horn and light systems according to a yet further embodiment of the disclosure.

In a further aspect of the disclosure, as shown in FIG. 5, a vehicle warning system designated generally as 10'' includes a threat detection system designated generally as 12 and a vehicle braking system designated generally as 30. The threat detection system can activate the braking system when a threat is detected. Simultaneously, or consecutively, activation of the braking system activates the vehicle horn and light system to operate simultaneously, or separately, without input from the driver, or with the simultaneous or subsequent manual operation of the brake system by the driver. In one embodiment as shown in FIG. 5, activation of brake system 30 results in a signal being sent via hard wire or wirelessly with one or more RF or infra-red transmitters and one or more RF or infrared receivers to central processing unit or controller 28. Controller 28 sends a signal to a switch 40 that controls whether controller 28 (or any of the controller embodiments disclosed herein), operates the horn exclusively, the lights exclusively, or the lights and horn simultaneously. Switch 40 is positioned between controller 28 and light system(s) 16, or, if light relay 17 is used, between controller 28 and light relay 17.

In an open position, switch 40 does not connect controller 28 with light system(s) 16 and/or horn system 14. In a closed position, switch 40 operates the horn and light systems simultaneously. In this embodiment, the vehicle operator must manually activate the horn and light systems when switch 40 is closed.

In an alternate embodiment shown in FIG. 5, a vehicle warning system designated generally as 10ᵛ includes a threat detection system 12 and a brake system 30 connected via an intermediary controller 28. Activation of brake system 30 by threat detection system 12 results in the substantially simultaneous, or independent, consecutive, sequential, and/or random activation or operation of the combined horn and lights systems to give the desired warning signals to other vehicles or individuals within the signals reception area. In this embodiment, threat detection system 12 and brake system 30 is connected to controller 28 via hard wire or wirelessly with one or more RF or infra-red transmitters and one or more RF or infrared receivers Controller 28 is connected directly to the horn and light systems, or indirectly via horn and light system relays as shown and disclosed herein.

In this embodiment, warning system 10' begins with one or more sensors 13 of threat detection system 12 detecting a potential threat. This triggers threat detection system 12 to send a signal to controller 28, which, in turn, sends a signal to activate brake system 30. Depending upon whether brake system 30 is connected to horn system 14 and light system 16 directly, or indirectly via controller 28, activation of brake system 30 sends a signal either directly to horn system 14 and/or light system(s) 16, or indirectly via controller 28. Relays may or may be incorporated into the connections between the described sub-systems.

If controller 28 is incorporated into the sub-system connections, controller 28 may be preprogrammed to activate horn system 14 and/or light system(s) 16 with audible and visual warning patterns that include illustratively, sustained or pulsating audible or visual warning signals that can vary in terms of intensity, duration, frequency, modulation, etc. As with other aspects of the disclosure, controller 28 may be programmed to activate the light system to emit pulsing light flashes in some pre-determined pattern to impart a specific type of warning signal(s). Cessation of warning signals may be prompted by a cessation in threat detection, or by a pre-programmed warning signal duration. It may be advantageous to program the activation of the horn and/or light systems to sustain the warning signals for a period of time after the detected threat is no longer perceived or detected as present by threat detection system 12. This ensures an added level of safety in the event there is a malfunction of the detection system (faulty sensor), or the potential threat source is simply out of the range of the sensors and not necessarily outside a safety range for the vehicle in which the threat detection system is secured.

In a further aspect of the disclosure, a predetermined force range, or threshold for manual brake pedal operation is implemented to override automated control of the brake system by the threat detection system and simultaneous and/or separate operation of the horn and light systems with the brake system. This alternative embodiment serves the purpose of permitting the driver to actively engage the brake system and concurrently or consecutively engage the horn and/or light systems when brake activation is used during a driver-perceived safety situation. For example, the operation of the braking system to stop at a stop sign or traffic signal may not warrant operation of the horn/light systems without the presence of a dangerous condition, such as the presence of another vehicle whose operator appears to be ignoring, or does not perceive a red traffic signal. The predetermined force range or force threshold for manually applying the brakes enables the driver to use the brake system without engaging the horn and/or light systems. Application of a force on a brake pedal that exceeds the force threshold will manually override the threat detection automated system and result in the horn and/or light systems being activated by manual brake activation.

To ensure undesired operation of the horn/light systems, illustratively a range of from about 100 lbs./in.$^2$ to about 200 lbs./in.$^2$ or threshold of 100 lbs./in$^2$ may be set as the brake pedal force range in which operation of brake system 30 results in a signal being sent to controller 28" to substantially simultaneously or separately operate the horn and/or light systems. As should be well understood in the art, the force range may be set to any desirable range that differentiates between a normal driving event versus an emergency event.

In a further aspect of the disclosure, the determined severity or immediacy of the threat, or multiple threats, determines whether the horn and/or light systems are activated substantially simultaneously with activation of the vehicle brake system. In this embodiment, a predetermined activation time interval is selected to substantially simultaneously activate the horn and/or light systems with the brake system. The time interval is determined by using the time the threat is detected, the distance of the threat at the time detected and the closure rate to impact or collision between the threat and the vehicle. Based on this compiled information, the central processing unit determines a probable time of impact or collision and sets a time threshold, (a time period that begins with the time at which the threat was detected) that is less than the difference between the time of threat detection and the probable time of impact, when the systems (brake, light and/or horn) are to be activated. If the threat is removed before the time threshold is reached, the systems are not activated. In contrast, a quickly approaching detected threat that is not removed within the calculated activation time threshold signifies a potential emergency situation that will trigger activation of the three systems by the controller or central processing unit.

By setting the systems activation time threshold to correlate with the severity or immediacy of a potential emergency situation coupled with the continued detected presence of the threat at the time the pre-determined activation time threshold is reached, activation of the horn and/or light systems with the brake system can be limited to true emergency situations. If the activation time threshold is not yet reached, or if the threat is removed before the time threshold is reached, the systems will not be activated.

In this embodiment, if a threat is detected and remains present when a calculated time threshold for system activation is reached, controller 28 sends an activation signal directly, or via relay as disclosed herein, to the brake system and to the horn and/or light systems to issue warning signals while the vehicle is being automatically decelerated. Due to the variability of threats in terms of severity and immediacy, the calculated time interval for systems activation will vary with the particular threats detected in a given period of time.

Figure 7:
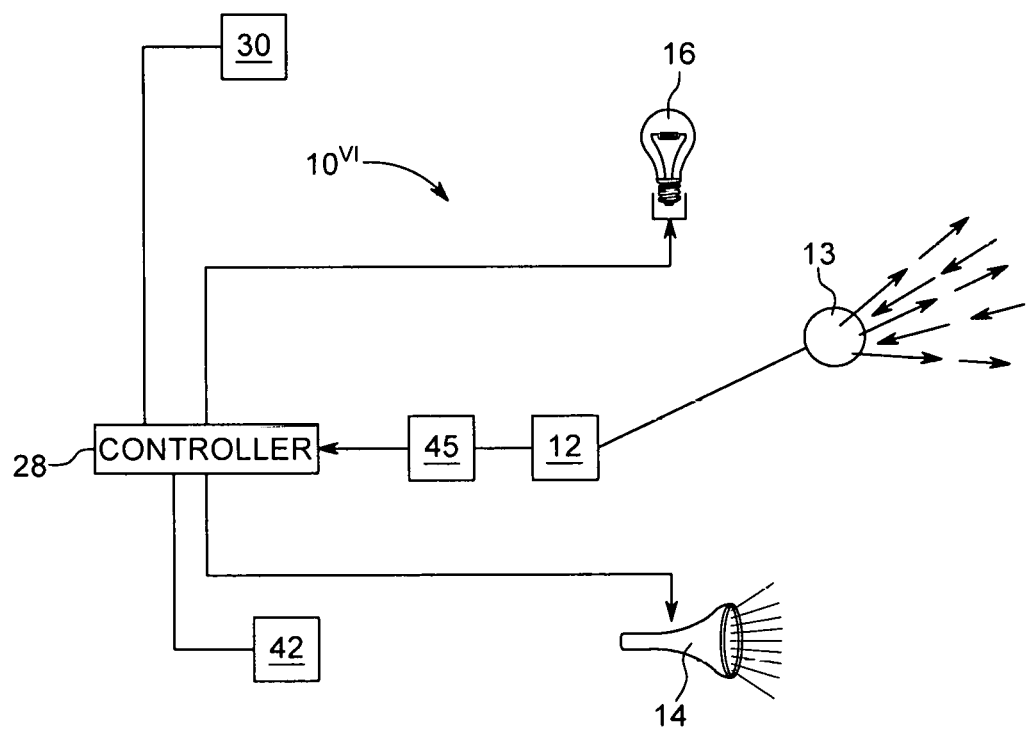
FIG. 7 shows a schematic of a threat detection system connected to a horn/light/brake controller with a threat detection disengagement system and accelerometer according to a further embodiment of the disclosure.

In a still further aspect of the disclosure as shown in FIG. 7, a vehicle warning system designated generally as $10^{vi}$, includes an accelerometer 42 to determine vehicle speed changes. Significant deceleration changes of a vehicle's speed causes controller 28 to activate either or both the horn and light systems and optionally, the braking system. To monitor vehicle speed, accelerometer 42 is connected to controller 28. Accelerometer 42 provides the necessary data to determine the speed of the vehicle. The data is fed to controller 28 where it is processed to determine vehicle speed. When a preselected change in velocity (decrease) is detected, controller 28 is programmed to operate the horn and/or light systems substantially simultaneously, and the brake system as well, if a deceleration event is detected and not caused by manual brake activation. Such deceleration events may occur as a result of an evasive maneuver to avoid a vehicle accident.

In this embodiment, an illustrative threshold speed deceleration change, e.g., −30 m.p.h. or more within a specified period of time, e.g., 5 seconds, is preselected as a vehicle speed change that will activate automated coordination of the vehicle's horn and/or light systems with or without the vehicle's braking system when activated. By preprogramming controller 28 for the preselected speed change, once a vehicle experiences the selected speed deceleration change, controller 28 sends an activation signal directly, or via relay as disclosed herein, to the horn and/or light systems to issue warning signals. The type, direction, duration, frequency and intensity of the signals can be pre-programmed into the activation system to emit warning signals with commonly known meanings (simulated ambulance siren, etc.).

Figure 8:
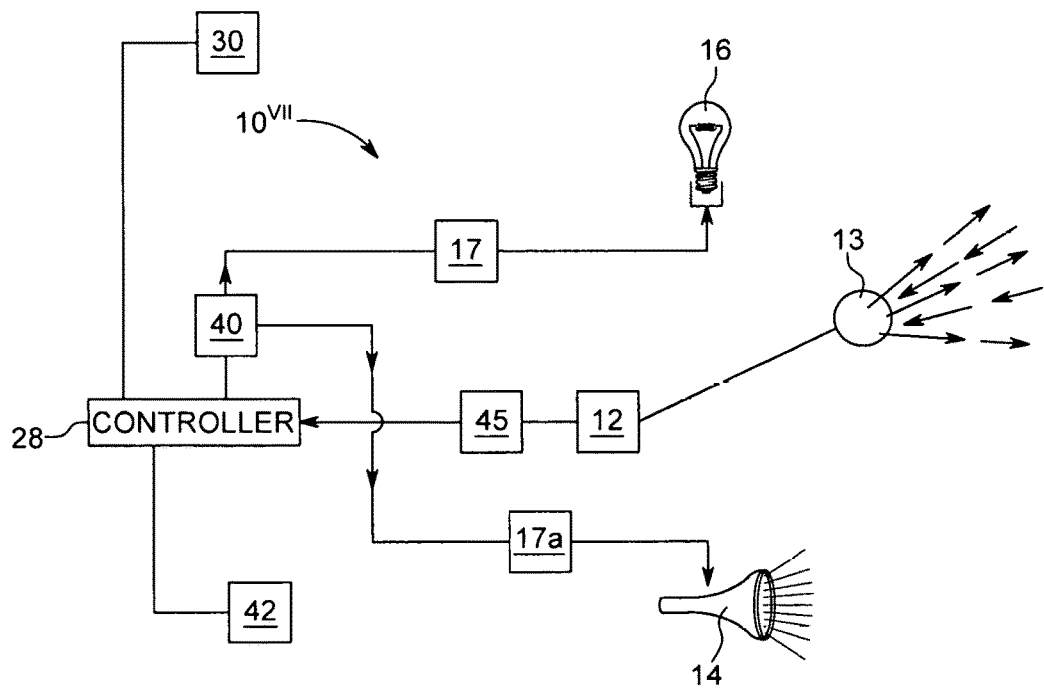
FIG. 8 shows a schematic of a threat detection system connected to a horn/light/brake controller with light, horn and threat detection system relays with a threat detection system disengagement system, accelerometer and horn/light system switch according to a yet further embodiment of the disclosure.

In a further embodiment of the disclosure as shown in FIG. 8, a vehicle warning system designated generally as $10^{viii}$ incorporates an accelerometer with a control switch. Rather than coordinate horn and/or light system activation with brake system activation, controller 28 (and disclosed variants thereof), simultaneously controls the horn and light systems as described herein when the preselected speed deceleration change threshold is reached. In this embodiment, accelerometer 42 sends vehicle speed data to controller 28. If the vehicle's detected speed change reaches the preselected threshold, controller 28 sends a signal to a switch 40 that activates horn system 14 and/or light system 16.

In an alternative embodiment, a dedicated horn/light controller may be incorporated into the warning system between controller 28 and the horn and light systems. With this activation, it should be understood that control of light system 16 with the resident conventional light controller remains effective. Alternatively, the combination may be configured to deactivate the conventional light system controller when the combination horn/light controller is activated. In a further alternate embodiment, a threat detection system deactivation or disconnection switch 45 may be secured between controller 28 and threat detection system 12 to permit the driver to disconnect the system from the other brake, horn and light systems.

In a further aspect of the disclosure, the ambient environmental lighting conditions are monitored to determine whether the light system engagement should involve high beam, low beam or some alternative mix of all the vehicle's lights to impart a warning signal that does not itself create a potentially dangerous situation. At night, use of the high beam setting for flashing may cause temporary blindness of oncoming traffic and cause additional danger or emergency situations. To prevent this, coordination of the vehicle light system with the vehicle's braking system may be implemented to adjust to different ambient light conditions.

In this embodiment, an ambient light detector, as commonly known in the art, is incorporated into the vehicle to detect ambient environmental lighting conditions. Detected conditions are sent via signal via hardwire or wirelessly to controller 28. Controller 28 is preprogrammed to activate, via hard wire or wirelessly, directly or indirectly via relay, various vehicle lights in accordance with preselected light combinations. Activation of the combined or separate horn and light systems by threat detection system 16, directly, or through intermediate activation of brake system 30 activates the horn and light systems according to the preprogrammed combinations.

It should be understood and apparent that light configurations shown are for illustrative purposes only and that any combination of light configurations may be possible, including head lights in both high and low beam settings, fog lights, driving lights, running lights, hazard lights, LED running lights, parking lights, reverse lights, braking lights, interior lights and dedicated lights included in a vehicle for the specific purpose of operating in conjunction with the vehicle horn and/or braking systems. Combined brake and light operation initiated or activated by one or more threat detection systems will function the same as manual operation of the braking system, or may include flashing sequences or brightness fluctuations to differentiate from normal brake operation so as to further enhance the warning effect. Redundant sets of lights placed on the rear, sides and/or front of vehicle may also be included for specific warning purposes.

It should also be understood and apparent that the lights may be any of a variety of types including incandescent, halogen, ultra violet, infrared, LED and the like. The lights may be further modified to function as strobe or flashing lights to make more conspicuous and improve visibility when a warning signal is being sent. In the event dedicated warning lights are incorporated into a vehicle, the lights may be further distinguished from the conventional lights by being colored with a color selected to be different from the colors used for other vehicle lights like red for brake lights, or emergency lights, such as blue used on law enforcement vehicles. Color schemes may also be implemented to signify different types of warnings. For example, a yellow light could designate an approaching hazard while a green light could signify imminent danger.

Threat detection system automated control of the braking, horn and/or light systems described herein is intended for implementation in any vehicle used to carry passengers including illustratively boats, trains, buses (commercial and school), cars (driver-piloted and fully automated), vans, SUV's and trucks. The system can be implemented for internal warning as well, such as in a school bus, to ensure children seated in the bus are properly alerted to any imminent danger.

Figure 14:
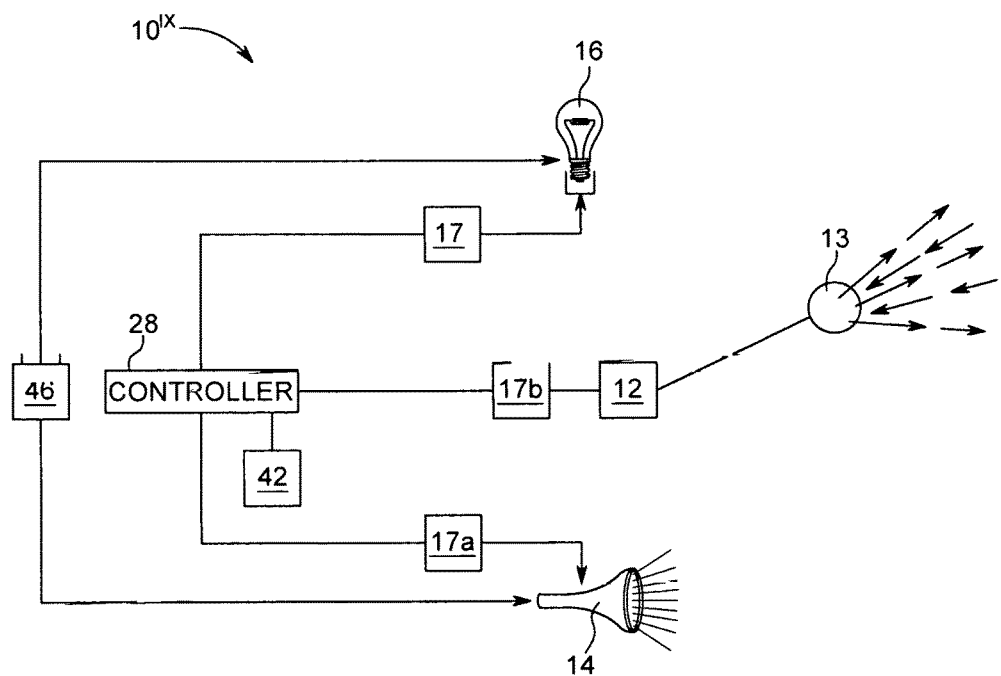
FIG. 14 shows a schematic of a combined horn/light operating system with a battery backup according to yet another embodiment of the disclosure.

Referring now to FIG. 14, in a further aspect of the disclosure, the automated dual horn/light warning system designated generally as 10$^{tx}$ may be configured to operate after a vehicle disabling accident. Dual horn/light system activation, post-accident, can be triggered in one of several ways. Activation can be triggered by a sudden catastrophic deceleration event (detected by accelerometer 42) that ends in cessation of movement. This could result from a head-on impact with another vehicle or with a stationary object, such as a wall. It could also result from a loss of control and turnover event. All of these accident scenarios result in the vehicle coming to a complete stop in an uncontrolled manner. Either the threat detection system via detection of a threat or the onboard computer determines an accident has occurred. Once an accident has been detected, a signal is sent to the horn and light systems via any of the wired or wireless methods disclosed herein to activate the horn and light systems in a sustained manner. The horn and light operation can be programmed to operate in a pulsing or intermittent manner to give pulses of sound and light, or may impart sustained sound and light signals by remaining on.

Should the vehicle battery become disabled or nonfunctional, a backup battery 46 may be incorporated into the vehicle to run the horn and light systems after an accident. The backup battery will not be connected to any battery disabling function operated by the onboard computer. This ensures that audible and visual signals will be emitted by the systems for the duration of the battery life of the main battery and/or the backup battery to improve the chances of the accident being perceived by passing vehicles or pedestrians. This is particularly advantageous if an accident event results in a vehicle crashing or stopping in a remote location not readily seen from a road, or other location frequented by people.

Referring now to FIGS. 10-13, in a further aspect of the disclosure, turn-signal function is controlled automatically by an onboard GPS system. The GPS system 60 is connected via hardwire or wirelessly to a turn-signal system 62 to permit operation of the turn-signal directional arrow lights by inputs or signals received from the GPS system. Turn-signal activation is coordinated with travel routes programmed into the GPS system. Once a travel route has been selected, the GPS system provides visual and/or audible guide directions to the driver. When a turn in the travel route is approaching, at a preselected distance from the turn, a signal is sent directly to the turn-signal system to activate the appropriate directional arrow. In an alternate embodiment, the GPS system and the turn-signal system are connected via hard wire or wirelessly, to the vehicle's onboard computer, or electronic control unit 28. In this embodiment, when a turn is approaching, the GPS system sends a signal to the computer, or electronic control unit, which sends a signal to the turn-signal system to activate the appropriate turn or directional light 64 to signal and alert other vehicles and any pedestrians present in the vicinity of the vehicle about the approaching turn. An audible and/or visual signal is provided by the GPS system to the driver to alert the driver to make the turn. This signaling coincides with the signaling sent to the directional lights.

Figure 13:
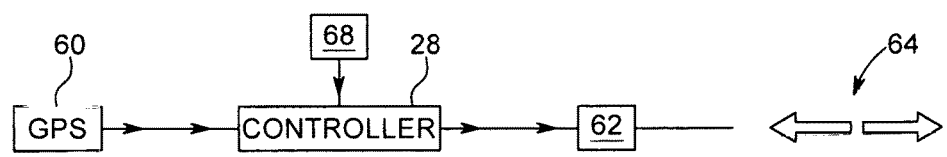
FIG. 13 shows a schematic turn signal system controlled indirectly by a GPS system with an intermediary controller and a directional arrow system disengagement switch according to a still further embodiment of the disclosure.

The automated control of the turn signal system by the GPS system can be configured to operate in conjunction with manual control of the turn signal system. Control of the turn signal system may also be configured to permit manual override of the directional signal activated by the GPS system. This can be accomplished in at least two illustrative manners. In one embodiment shown in FIG. 11, operation of the turn-signal lever or controller by the driver will override any signal received directly, or indirectly, from the GPS system. This is particularly advantageous when a driver decides to take a different route due to traffic conditions, etc. In a second illustrative embodiment as shown in FIG. 13, a control knob 68, lever or some other manually controllable device permits deactivation of the GPS system control over the turn signal system. In yet another embodiment, the GPS system is programmed with a feature that allows the driver to deselect GPS control over the turn signal system.

While the present disclosure has been described in connection with several embodiments thereof, it will be apparent to those skilled in the art that many changes and modifications may be made without departing from the true spirit and scope of the present disclosure. Accordingly, it is intended by the appended claims to cover all such changes and modifications as come within the true spirit and scope of the disclosure.

What we claim as new and desire to secure by United States Letters Patents is:

1. An apparatus for operating automatically vehicle horn, light and braking systems simultaneously comprising:
   a vehicle;
   a threat detection system for detecting external threats secured in the vehicle, wherein the threat detection system comprises at least one sensor for detecting external threats;
   an electronic control unit secured in the vehicle and connected to the threat detection system;
   a vehicle horn system secured in the vehicle for emitting audible signals and connected to the electronic control unit;
   a vehicle light system secured in the vehicle for emitting visual signals from the front, side and/or back of the vehicle, wherein the vehicle light system is connected to the electronic control unit;
   a vehicle braking system incorporated into the vehicle and connected to the electronic control unit, wherein detection of an external threat by the at least one sensor sends at least one signal to the electronic control unit, which, in response to the at least one signal, sends at least one activation signal to automatically and simultaneously activate the braking system, the horn system and the light system without driver input.

2. The apparatus of claim 1 further comprising relays positioned between the electronic control unit and the horn system and light system to relay signals received from the control unit.

3. The apparatus of claim 2 further comprising at least one light in the light system wherein the electronic control unit operates the at least one light when the electronic control unit is engaged.

4. The apparatus of claim 3 further comprising a central processing system connected between the electronic control unit and the horn and light systems to process and relay signals from the electronic control unit to the horn and light systems.

5. The apparatus of claim 3 wherein the electronic control unit is wired directly to the horn and light systems.

6. The apparatus of claim 5 further comprising a relay between the electronic control unit and horn system.

7. The apparatus of claim 5 further comprising a relay between the electronic control unit and light system.

8. The apparatus of claim 3 further comprising at least one transmitter connected to the electronic control unit and at least one receiver connected to the horn and light systems to wirelessly transmit signals from the electronic control unit to the horn and light systems.

9. The apparatus of claim 1 wherein the electronic control unit comprises a pair of horn contacts and a pair of light contacts whereby an electrical signal is sent to the horn system when the horn contacts touch and an electrical signal is sent to the light system when the light contacts touch.

10. The apparatus of claim 1 further comprising a light control switch positioned in the vehicle and positioned electrically between the electronic control unit and the light system wherein the light control switch disengages the light system from control of the electronic control unit when activated.

11. The apparatus of claim 1 further comprising a plurality of electronic control units to control the brake, horn and lights systems.

12. The apparatus of claim 11 wherein the plurality of electronic control units receive signals from a central processor that receives one or more signals from the threat detection system.

13. The apparatus of claim 12 wherein the plurality of electronic control units are secured to one or more buses.

14. An apparatus for automatically operating a vehicle horn and/or light system comprising:
   a threat detection system for detecting external threats secured in a vehicle; wherein the threat detection system comprises at least one sensor for detecting external threats;
   a controller secured in the vehicle, wherein the controller is connected to the threat detection system;
   a vehicle horn system for emitting audible signals secured in the vehicle;
   a vehicle light system for emitting visual signals from the front, side and/or back of the vehicle, wherein the vehicle light system is secured in the vehicle; and,
   a brake system secured in the vehicle, wherein detection of a threat by the threat detection system sends at least one signal to the controller, which sends at least one activation signal to the brake system to automatically activate the brake system, which sends a feedback signal to the controller during or after brake activation to send an activation signal to the horn and/or light systems to automatically activate one or both systems.

15. The apparatus of claim 14 wherein the apparatus further comprises relays secured between the controller and sub-systems including the horn system, the light system and the threat detection system.

16. A method of automatically operating a vehicle horn system and a vehicle light system simultaneously comprising the steps of:
   providing a vehicle with a threat detection system for detecting external threats secured in the vehicle, wherein the threat detection system comprises at least one sensor for detecting external threats;
   providing a vehicle horn system for emitting audible signals secured in the vehicle;
   providing a vehicle light system for emitting visual signals from the front, side and/or back of the vehicle, wherein the vehicle light system is secured in the vehicle;
   providing a brake system secured in the vehicle;
   providing an electronic control unit secured in the vehicle connected to the threat detection system, the horn system, the light system and the brake system;
   detecting a threat with the threat detection system;
   sending a signal from the threat detection system to the electronic control unit; and,
sending a first activation signal from the electronic control unit to the horn system and the light system to automatically and simultaneously activate the horn and light systems.

17. The method of claim 16 further comprising the step of sending a second activation signal from the electronic control unit to the brake system to activate the brake system brakes.

18. The method of claim 17 further comprising the step of:
   sending the first and second signals simultaneously to automatically operate the brake system, the horn system and the light system simultaneously.

* * * * *